(12) United States Patent
Puntigam et al.

(10) Patent No.: US 11,441,735 B2
(45) Date of Patent: Sep. 13, 2022

(54) HIGH PRESSURE VESSEL

(71) Applicant: MAGNA Energy Storage Systems GesmbH, Sinabelkirchen (AT)

(72) Inventors: David Puntigam, Gross St. Florian (AT); Andreas Preitler, Gratkorn (AT); Rainer Puchleitner, Graz (AT)

(73) Assignee: MAGNA Energy Storage Systems GesmbH, Sinabelkirchen (AT)

( * ) Notice: Subject to any disclaimer, the term of this patent is extended or adjusted under 35 U.S.C. 154(b) by 0 days.

(21) Appl. No.: 17/233,502

(22) Filed: Apr. 18, 2021

(65) Prior Publication Data

US 2021/0381648 A1 Dec. 9, 2021

(30) Foreign Application Priority Data

Jun. 5, 2020 (EP) ..................................... 20178485

(51) Int. Cl.
*F17C 1/16* (2006.01)
*F17C 13/06* (2006.01)

(52) U.S. Cl.
CPC ................ *F17C 1/16* (2013.01); *F17C 13/06* (2013.01); *F17C 2201/0119* (2013.01); *F17C 2203/067* (2013.01); *F17C 2203/0621* (2013.01); *F17C 2205/0323* (2013.01); *F17C 2205/0397* (2013.01)

(58) Field of Classification Search
CPC ...... F17C 2205/0305; F17C 2205/0302; F17C 2205/03; F17C 2205/0323; F17C 2201/0119; F17C 2203/0621; F17C 2203/067; F17C 2203/0604
See application file for complete search history.

(56) References Cited

U.S. PATENT DOCUMENTS

| 5,476,189 A | * | 12/1995 | Duvall | ...................... F17C 1/16 220/62.19 |
| 8,505,762 B2 | * | 8/2013 | Holbach | ................. F17C 13/06 220/586 |
| 2004/0173618 A1 | | 9/2004 | Fujihara et al. | |

(Continued)

FOREIGN PATENT DOCUMENTS

| DE | 102015105901 | * | 10/2016 |
| JP | H10332083 A | | 12/1998 |
| JP | H10332085 A | | 12/1998 |

*Primary Examiner* — Don M Anderson
(74) *Attorney, Agent, or Firm* — Jordan IP Law, LLC; Todd A. Vaughn

(57) ABSTRACT

A high-pressure container includes a cylinder composed of plastic, at least one half-shell composed of plastic, a substantially rotationally symmetrical insert as a boss member, and a sleeve. The cylinder is to serve as a centre member, while the at least one half-shell is at an axial end of the cylinder. The insert as a boss member, the insert having a foot member at an end thereof facing the container interior. The foot member is embedded in the plastic of the half-shell to substantially form a hollow cone or hollow cylinder. The sleeve is pressed into the inner circumference of the foot member at least in a pressing portion of the sleeve. The plastic of the half-shell is arranged between the sleeve and an inner circumference of the foot member so that in a pressing portion, a thin plastic layer of the plastic of the half-shell is pressed between the sleeve and the inner circumference of the foot member.

3 Claims, 7 Drawing Sheets

(56) References Cited

U.S. PATENT DOCUMENTS

| | | | |
|---|---|---|---|
| 2008/0251520 A1* | 10/2008 | Ota | F17C 1/16 |
| | | | 220/586 |
| 2009/0255940 A1* | 10/2009 | Murate | F17C 1/16 |
| | | | 220/661 |
| 2011/0108557 A1* | 5/2011 | Tani | F17C 1/16 |
| | | | 220/586 |
| 2014/0144866 A1* | 5/2014 | Heo | F17C 13/002 |
| | | | 215/45 |
| 2016/0025266 A1* | 1/2016 | Leavitt | F17C 1/06 |
| | | | 206/0.6 |
| 2017/0268724 A1* | 9/2017 | Kanezaki | F17C 1/04 |
| 2017/0284601 A1 | 10/2017 | Kusaba et al. | |
| 2019/0170300 A1 | 6/2019 | Cola et al. | |

\* cited by examiner

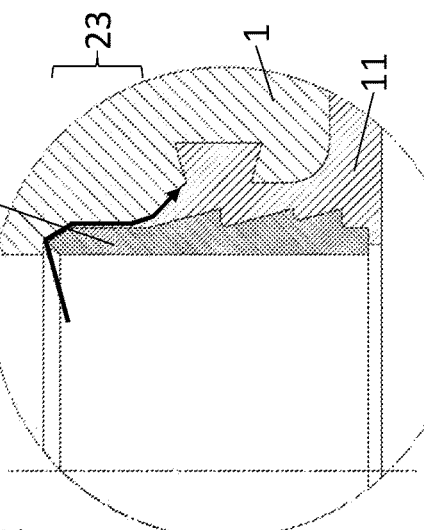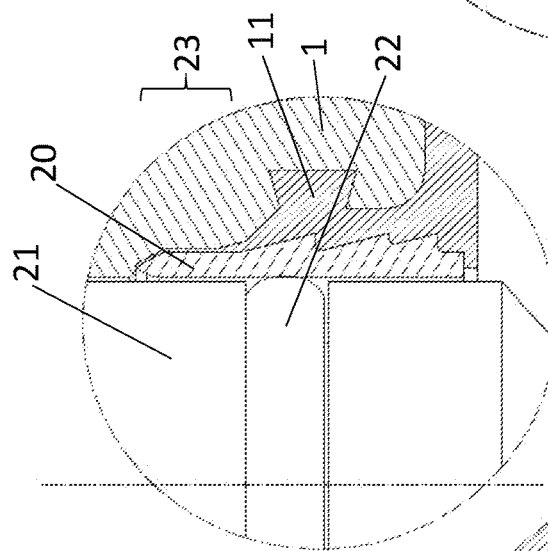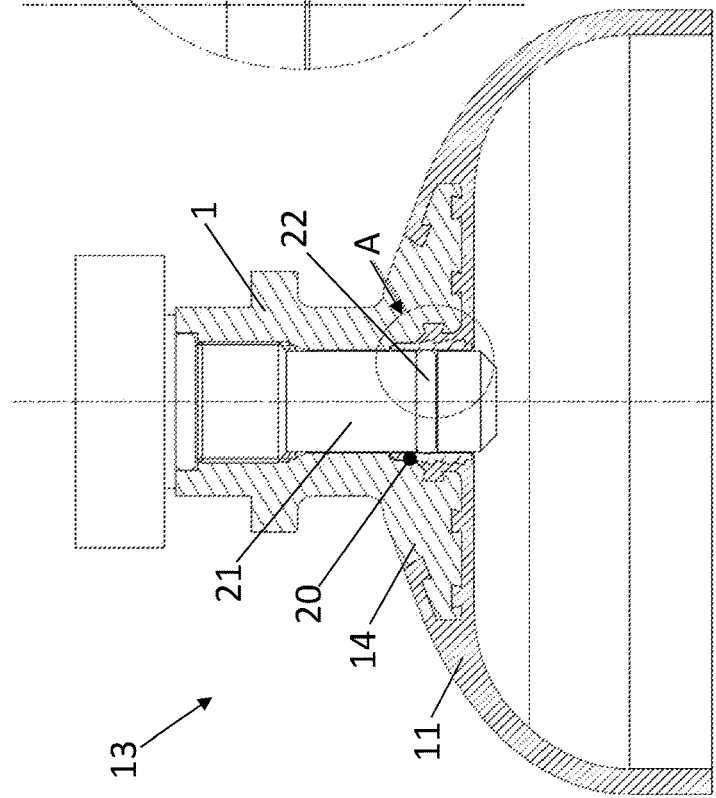

HIGH PRESSURE VESSEL

CROSS-REFERENCE TO RELATED APPLICATIONS

The present application claims priority 35 U.S.C. § 119 to European Patent Publication No. EP 20178485.7 (filed on Jun. 5, 2020), which is hereby incorporated by reference in its entirety.

TECHNICAL FIELD

One or more embodiments relate to a high-pressure container, in particular, a high-pressure container for storing a fuel for a motor vehicle.

BACKGROUND

It is known that high-pressure containers, for example, high-pressure containers for storing hydrogen as fuel for motor vehicles, may be constructed from an internal layer, known as the liner, and a wrapping of fibre material around the liner.

To produce a container, it is known to use the technologies of blow-moulding and thermoforming. Production is then based on the shaping of hose-like or platform-like semifinished products. These are brought into their final shape by vacuum and/or positive pressure. For example, two half-shells may be produced which are joined together to form a container.

For the case of gas-tight liners for type IV containers which are used for pressurised storage of gases, there are two standard production methods. Firstly, blow-moulding of complete liners, and secondly the method of producing segments of the container in the injection-moulding and extrusion process, and subsequently connecting these components by a joining process.

The materials used here are mostly based on HDPE (high density polyethylene) or polyamides.

Important distinguishing features for liner materials are the mechanical low-temperature properties and the emission properties. Mono-layer materials such as polyamide have a good barrier property for gases but do not have optimal low-temperature properties. On the other hand, HDPE does not have a suitable barrier effect but has excellent low-temperature properties.

For this reason, at present mainly polyamide is used for applications in the hydrogen sector in particular. However, above all for blow-moulding technology, this imposes limits with respect to component size. Because of their complex additive structure, the suitable types available are also costly and problematic for use at low temperatures.

High-pressure containers for gases are subjected to great temperature fluctuations during operation (filling, storage and evacuation). These impose high requirements on the materials and in particular on the liner.

In connection with lightweight construction and the use of composite materials, in this context there arises the challenge of connecting the different materials together gastightly at the joining point.

SUMMARY

One or more embodiments are to enhance a high-pressure container in this respect, and in particular, provide a high-pressure container which also meets the requirements applicable to high-pressure containers for tightness and permeation in a transitional region to a boss member. One or more embodiments are to also provide a high-pressure container which can be produced economically.

In accordance with one or more embodiments, a high-pressure container comprises a cylinder, composed of plastic, as a centre member; at least one half-shell, composed of plastic, at an axial end of the cylinder, the half-shell comprising a substantially rotationally symmetrical insert as a boss member, the boss member having a foot member at the end thereof facing the container interior and which is embedded in the plastic of the half-shell to substantially form a hollow cone or hollow cylinder; a sleeve pressed into the inner circumference of the foot member at least in a pressing portion of the sleeve, wherein the plastic of the half-shell is arranged between the sleeve and the inner circumference of the foot member so that in the pressing portion, a thin plastic layer of the plastic of the half-shell is pressed between the sleeve and the inner circumference of the foot member.

In accordance with one or more embodiments, the material for the liner, both in the centre member formed by the cylinder and also in at least one, preferably both axial end regions of the container, is a plastic, in particular, a plastic multilayer composite. Plastics, in particular, multilayer plastics which comprise a barrier layer, can easily be formed into a half-shell via blow-moulding, deep-drawing, or vacuum-forming. The cylinder in the centre member can also be blow-moulded or, for example, extruded.

In accordance with one or more embodiments, the boss member which comprises a foot member is provided. The foot member substantially forms a hollow cone or hollow cylinder. The foot member is embedded in the plastic of the half-shell. The plastic thus surrounds the boss member on at least two sides. The foot member has a greater diameter than an adjacent centre member of the boss member. The foot member thus forms an undercut with respect to a plastic of the liner, which is introduced from the side of the foot member or the container middle point. The plastic is arranged axially on both sides of the foot member, i.e., on both sides of the undercut, i.e., on a surface of the boss member facing the container middle point and on a surface of the boss member facing away from the container middle point.

Production of the half-shell with an embedded boss member and of the complete high-pressure container is nonetheless possible in economic fashion, since as will be described hereinbelow, it is possible to introduce the plastic via blow-moulding or vacuum deep-drawing despite the undercut on the foot member of the boss member.

The foot member is hollow in the inside, in the region of its longitudinal centre axis, and therefore, substantially forms a hollow cone or a hollow cylinder.

In accordance with one or more embodiments, a sleeve, composed of a metal, is pressed into the inner circumference of the foot member at least along a pressing portion of the sleeve extending in the axial direction of the sleeve. The plastic of the half-shell is also arranged in the intermediate spaces between the sleeve and the inner circumference of the foot member. A thin layer of the plastic of the half-shell is therefore pressed between the sleeve and the inner circumference of the foot member in the pressing portion. Thus, in the pressing portion, a thin plastic layer, i.e. a plastic film, of the plastic of the half-shell is pressed between the sleeve and the inner circumference of the foot member.

By the formation of the thin plastic layer on compression of the sleeve into the boss member, a reliable seal is created between the sleeve and the boss member. Because of the small thickness of the plastic film, the thermal expansion in operation and the shrinkage during the production process in this region are negligibly small and a good seal is guaranteed.

The thin plastic layer of the plastic of the half-shell, which is pressed between the sleeve and the inner circumference of the foot member, extends over the entire pressing portion. Particularly, the sleeve also has an axial portion outside the pressing portion, in which advantageously a thicker layer of the plastic of the half-shell is arranged. The plastic of the half-shell is to fill the entire space between the sleeve and the inner circumference of the foot member. The plastic of the liner, i.e., of the centre member and the half-shell, preferably both half-shells, is a multilayer composite plastic which comprises a barrier layer.

In accordance with one or more embodiments, a first groove or depression is provided. The first groove or depression is filled with the plastic of the half-shell, on the inner circumference of the foot member at the level of the sleeve. The first groove or depression extends at least in portions, i.e., for example, in individual sectors, around the entire inner circumference of the hollow cylinder or hollow cone. The first groove lies axially outside the pressing portion. In particular, the first groove may be formed axially adjoining the pressing portion.

The groove or depression is filled with the plastic of the half-shell. A "depression" may be configured similarly to a groove and in any case, and has at least one edge which acts as an undercut for the plastic lying behind it, so that the plastic is retained by form fit behind the edge in the region of the inner circumference.

The plastic of the half-shell is pressed by the sleeve against the inner circumference of the foot member and into the first groove. The plastic thus remains reliably in the first groove and the sealing effect is further increased.

In accordance with one or more embodiments, the foot member has at least one second groove which is filled with the plastic of the half-shell, wherein the second groove, arranged proximate to the inner circumference of the foot member, extends at least in portions on the base of the foot member facing the container interior. The second groove serves primarily also to increase the tightness between the liner and the boss member.

In accordance with one or more embodiments, the foot member has at least one third groove which is filled with the plastic of the half-shell. The third groove extends at least in portions on the cover face of the foot member facing the container exterior. In addition to increasing the tightness, the third groove also prevents the plastic from detaching from the boss member at the cover face of the foot member.

In accordance with one or more embodiments, the foot member has at least one fourth groove which is filled with the plastic of the half-shell, wherein in the vicinity of the outer circumference of the foot member, the fourth groove extends at least in portions on the base of the foot member facing the container interior. The fourth groove also prevents detachment of the plastic from the boss member.

In accordance with one or more embodiments, the first groove, and/or the second groove, and/or the third groove, and/or the fourth groove may have a trapezoid form which widens towards the base of the groove, so as to enhance the form fit of the plastic in the groove.

In accordance with one or more embodiments, in each of the grooves, particularly, the first groove and/or the second groove, an additional sealing element may be arranged on the base of the groove.

The plastic of the cylinder transforms into the plastic of the half-shell. A barrier layer in the plastic extends as continuously as possible at the transition between the cylinder and the half-shell.

The plastic is preferably a multilayer composite plastic. The multilayer composite plastic of the half-shell, and also the multilayer composite plastic of the cylinder, comprises at least one layer of HDPE, a barrier layer comprising EVOH, a regranulate, i.e., a regrind layer, and/or a second HDPE layer, and/or at least one adhesion-promoting layer.

In accordance with one or more embodiments, the high-pressure container comprises two half-shells at the axial ends of the cylinder, both half-shells being configured as described above for the first half-shell. The cylinder and the two half-shells may be wrapped with a fibre material, such as a composite material comprising carbon fibres and/or glass fibres and/or epoxy resin.

In accordance with one or more embodiments, the high-pressure container furthermore comprises a valve for extraction of the medium in the high-pressure container. The valve is received in the boss member such that a cylindrical shaft portion of the valve is received in the sleeve. The shaft portion of the valve is thus inserted in portions directly into the boss member and in portions into the sleeve inside the boss member. A sealing element, such as a ring seal, may be arranged in the high-pressure container between the valve and the sleeve in order to seal between the valve and the sleeve. Alternatively or additionally, a sealing element such as a ring seal, may seal directly between the shaft portion of the valve and the boss member, and particularly, closer to the axial end of the container than the sleeve. Thus, a seal may be used in a bottom region of the valve, namely firstly in the foot region of the boss member and/or also a higher-positioned seal.

In accordance with one or more embodiments, the sleeve extends up to the axial end of the boss member facing the container middle point, particularly preferably the sleeve extends beyond this end of the boss member.

In accordance with one or more embodiments, a method of manufacturing a high-pressure container with a tool having a first tool half forming a die, the method comprising: laying a preheated first plastic sheet on the first tool half; drawing or pressing the first plastic sheet onto the first tool half via vacuum pressure force such that the plastic of the first plastic sheet is arranged in regions behind an undercut of an rotationally symmetrical insert/a boss member, laterally spaced from the insert member; pressing or drawing via a slider, or a vacuum, pressure force, the plastic of the first plastic sheet onto the insert member behind the undercut, laterally spaced from the insert member so that a space behind the undercut of the insert member is filled with the plastic. Alternatively, after the first plastic sheet has been drawn or pressed onto the first tool half, the insert member is positioned such that plastic from the first plastic sheet is arranged in regions behind an undercut of the insert member, laterally spaced from the insert member.

Accordingly, in this way, the boss member is inserted in the tool as an insert member and, in a blow-moulding or deep-drawing process, surrounded by the plastic sheet, and particularly, a permeation-tight multilayer composite, so that the plastic also reaches regions behind an undercut. For this, firstly a plastic sheet is drawn or pressed onto the first tool half via vacuum pressure force. The insert member may already be positioned such that, by the drawing or pressing of the plastic onto the first tool half, the plastic of the first plastic sheet is arranged in regions behind an undercut of the insert member, laterally spaced from the insert member.

Alternatively, the insert member may be positioned only after drawing or pressing of the plastic onto the first tool half, such that plastic from the first plastic sheet is arranged behind the undercut, laterally spaced from the insert member, for example in that the insert member is moved or the insert member is only now introduced into the first tool half.

Then via a slider or a vacuum or a pressure, the plastic of the first plastic sheet is pressed or drawn onto the insert member from the side of the insert member, so that a space behind the undercut of the insert member is filled with plastic previously situated at the side, and a form-fit connection is created.

Thus, despite simple production via blow-moulding or vacuum-forming, the plastic also reaches regions behind the insert member. This ensures an enhanced sealing effect of the plastic, in particular the multilayer composite, onto the insert member, in particular the metallic boss member. To achieve the inclusion in the plastic, sliders and/or a vacuum or pressed air are used.

"Laterally spaced" here substantially means spaced from a longitudinal centre axis of the insert member which may preferably also coincide with the longitudinal centre axis of the pressure container. The plastic may initially extend substantially parallel to the longitudinal centre axis of the insert member, and preferably also to the surrounding container wall. The plastic is then drawn, blown, or moved up to the insert member in a direction substantially normal to the longitudinal centre axis of the insert member, and particularly, radially inwardly on all sides.

To ensure that the plastic may be drawn or pressed onto the insert member temporally after the positioning of the insert member, so that the plastic is arranged laterally spaced from the insert member in regions, a continuous process may also be applied so that the insert member is moved on and positioned each time, and new plastic drawn or pressed on again, so that the insert member is positioned and the plastic drawn or pressed behind the undercut effectively simultaneously.

The sleeve is pressed into the inner circumference of the foot member of the insert member, wherein in the pressing region, a thin plastic layer is created between the sleeve and the inner circumference of the foot member.

In a further process block, the resulting half-shell may be connected to a second half-shell or to an extruded or blow-moulded multilayer cylinder. This forms the core, and hence, the basis for a further winding process which may give the container its mechanical strength with a composite material of carbon and/or glass and epoxy resin.

The tool comprises a second tool half forming a punch that is brought onto the first tool half in order to form the inner contour of the half-shell. The second tool half may, for this, shape the form of the first plastic sheet in the interior of the half-shell. The second tool half may instead also be provided with a second plastic sheet which forms the inner contour of the half-shell.

After drawing or pressing the first plastic sheet onto the first tool half, the insert member is raised relative to the first tool half in order to position the insert tool such that the plastic of the first plastic sheet is arranged behind the undercut, laterally spaced from the insert member. This raising may take place using a movable receiver for the insert member. The insert member may be arranged on the first plastic sheet on the container outer side, and the raising may thus take place along the longitudinal centre axis of the insert member and preferably also along the longitudinal centre axis of the high-pressure container, and particularly, in the direction towards the later centre of the container.

After filling the space behind the undercut of the insert member with plastic, the insert member is lowered again relative to the first tool half. Particularly, the lowering takes place at the same time as the second tool half is moved onto the first tool half.

In accordance with one or more embodiments, the insert member is only laid on the first plastic sheet after the first plastic sheet has been drawn or pressed onto the first tool half, so as to position the insert member such that plastic from the first plastic sheet is arranged behind the undercut, laterally spaced from the insert member. The insert member may thus be arranged on the first plastic sheet on the container inner side. A second plastic sheet may again be arranged on the container inner side of the insert member.

The plastic of the first plastic sheet may be trimmed axially behind the plastic-filled space behind the undercut, so that no plastic remains behind the undercut, and particularly, on the container outer side of the undercut.

A preheated second plastic sheet is laid on the second tool half, and then is drawn or pressed onto the second tool half via vacuum pressure force. The second tool half with the second plastic sheet is then moved onto the first tool half in order to form the inner contour of the half-shell.

The first plastic sheet is composed of a multilayer composite which comprises a layer of HDPE (high-density polyethylene) and a barrier layer such as EVOH (ethylene vinyl alcohol copolymer). Particularly, the multilayer composite also comprises a regrind material or regranulate and/or one or more adhesion-promoting layers. HDPE forms the outermost layer of the multilayer composite and may also form the innermost layer.

A method for production or manufacture of a high-pressure container comprises producing a half-shell via the method described hereinabove, in which the half-shell is connected to another half-shell which, for example, may also comprise an insert member and be produced in the same manner as described above, or the half-shell is connected to at least one cylinder which is extruded or blow-moulded, and an end cap, in order to form a closed container.

The closed container is wrapped with a fibre material with a composite material comprising carbon fibres, and/or glass fibres, and/or epoxy resin.

DRAWINGS

One or more embodiments will be illustrated by way of example in the drawings and explained in the description hereinbelow.

FIG. 18 illustrates a sectional view of a half-shell of a high-pressure container with an inserted valve in accordance with one or more embodiments.

FIG. 19 illustrates a sectional view of detail A of the half-shell of FIG. 18.

FIG. 20 illustrates a sectional view of detail A of FIG. 19, but without a valve and a sealing element, with potential leakage path.

DESCRIPTION

Figure 1:
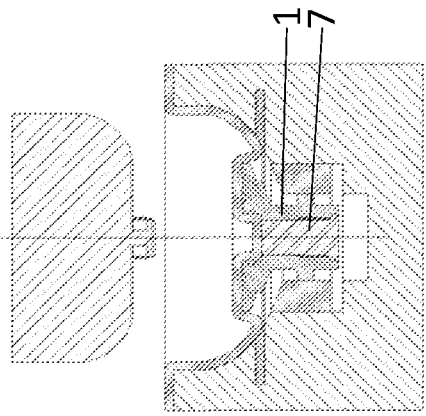
FIGS. 1 through 6 illustrate sectional views depicting process blocks of a method for producing a half-shell for a high-pressure container, in accordance with a first embodiment.
Figure 2:
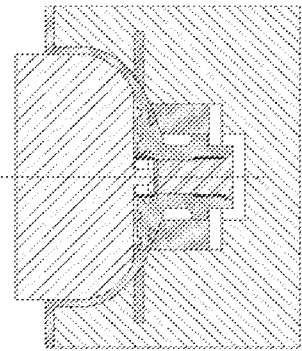

As illustrated in FIGS. 1 through 6, a method for production of a half-shell for a high-pressure container is provided in accordance with one or more embodiments. A tool comprising a first tool half 2 which forms a die, and a second tool half 5 which forms a punch. The tool thus comprises two tool halves, in which an insert member is positioned on a movable receiver 7 in the first tool half 2 which serves as the lower tool half. The second tool half 5, which serves as the upper tool half, acts as a punch in order to apply a pressure at the end of the process. In addition, the second tool half 5 may also be provided with a second insert member. Using sliders 4 provided in the tool and/or a vacuum, the plastic is brought to the points required for the form-fit connection. For this, a preheated first plastic sheet 3 is laid on the first tool half 2, and the first plastic sheet 3 is drawn or pressed onto the first tool half 2 via vacuum pressure force. Then the insert member 1, i.e., the boss member, is positioned such that plastic from the first plastic sheet 3 is arranged in regions behind an undercut, laterally spaced from the insert member 1. Alternatively, the movement of the insert member 1 may also be omitted, so that the plastic is drawn directly onto a correctly positioned insert member 1, corresponding to FIG. 3.

Then, via a slider 4, or a vacuum, or a pressure force, the plastic of the first plastic sheet 3 is pressed or drawn onto the insert member 1, behind the undercut from laterally spaced from the insert member 1, so that a space behind the undercut of the insert member 1 is filled with the plastic.

Finally, the second tool half 5 is moved onto the first tool half 2 in order to form the inner contour of the half-shell.

In detail, the single-sheet method depicted in FIGS. 1 through 6 comprises the following process blocks.

As illustrated in FIG. 1, in the first process block, the one tool half, namely the first tool half 2, is provided with the insert member 1, namely a boss member, and a preheated plastic sheet 3. The insert member 1 is in the starting position. Optionally, at this point, the second tool half 5 may be provided with a second insert member, and particularly, with the sleeve 20 which will be discussed later (FIGS. 17 to 21).

The plastic sheet 3 is drawn via vacuum into the first tool half 2 which constitutes the outer component geometry. In order to fill with plastic the space necessary for the form-fit connection behind the undercut of the insert member 1, the insert member 1 is positioned on a movable receiver 7 in the first tool half 2. By raising the component and for example simultaneous use of a vacuum and/or sliders 4, the space behind the undercut of the component is filled (See FIGS. 3 and 4).

Figure 5:
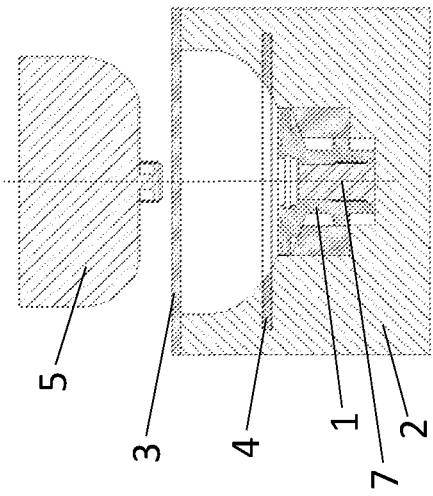
Figure 6:
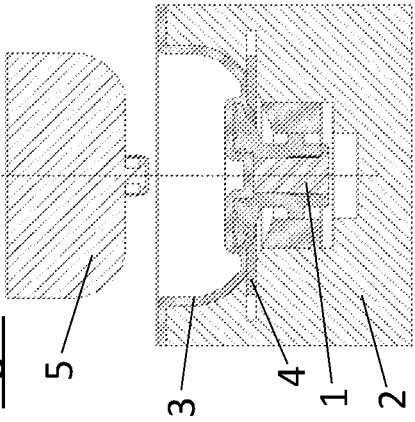
Figure 7:
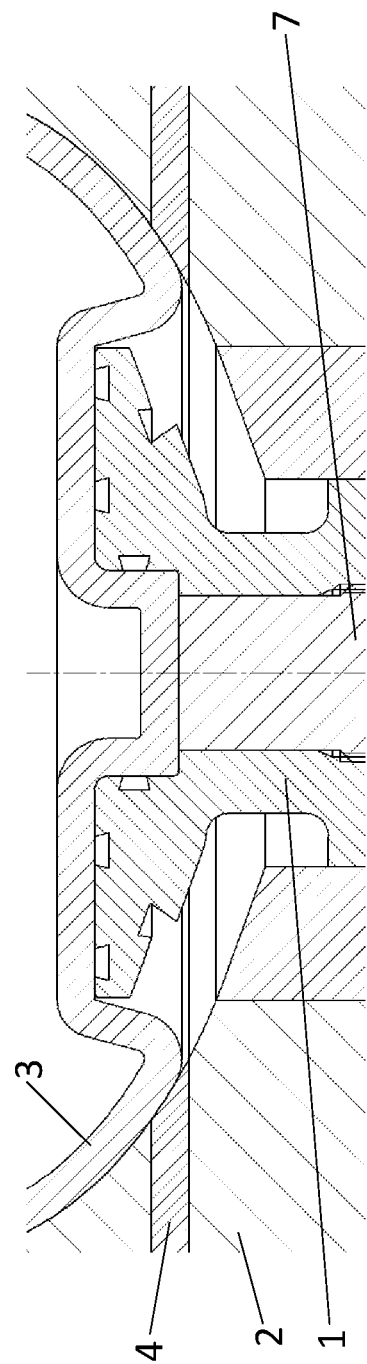
FIG. 7 illustrates a detail depiction of FIG. 3 in the region around the undercut of the insert member.
Figure 8:
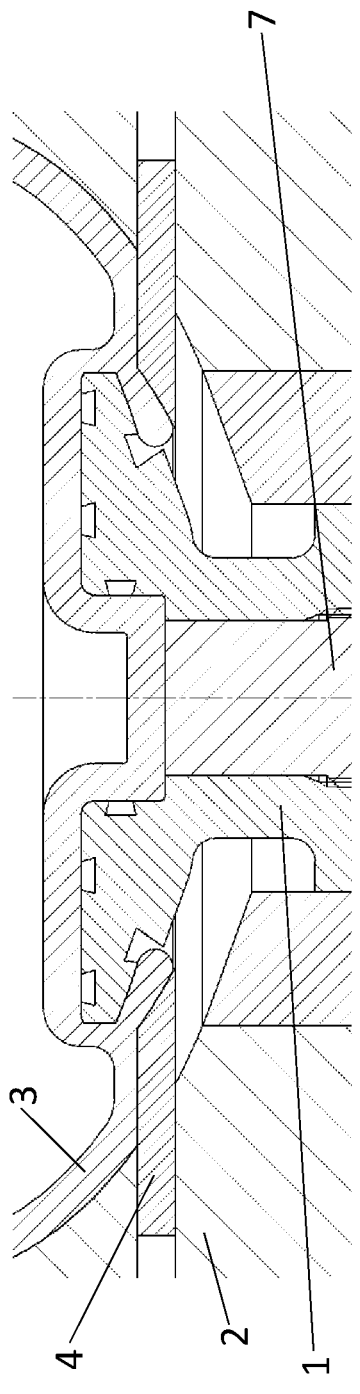
FIG. 8 illustrates a detail depiction of FIG. 4 in the region around the undercut of the insert member.

As illustrated in FIG. 5, in the next process block, the second tool half 5 is lowered onto the first tool half 2 with a defined closing force, forming the inner contour of the component. During this process block, the insert member 1 may in some cases be returned to the starting position. In this way, the plastic is additionally pressed behind the undercuts, and the form-fit connection between the insert member 1 and the plastic of the first plastic sheet 3 is enhanced.

An alternative embodiment of the production method is illustrated in FIGS. 9 through 14, namely a twin-sheet method for production of a half-shell.

Figure 9:
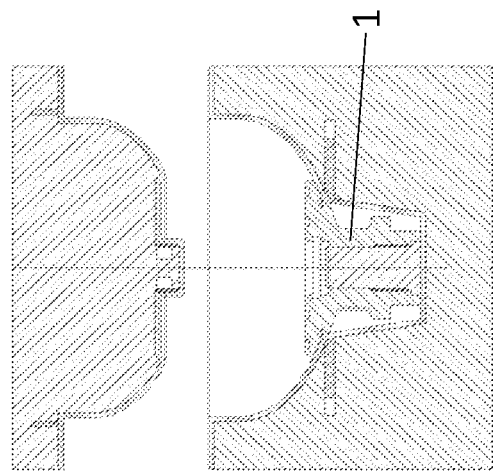
FIGS. 9 through 14 illustrate sectional views depicting process blocks of a method for producing a half-shell for a high-pressure container in accordance with a second embodiment.

As illustrated in FIG. 9, in the first process block of the twin-sheet method, both tool halves 2, 5 are provided with a preheated plastic sheet 3, 6. Optionally, at this point also the second tool half 5 may be provided with an insert member.

Figure 10:
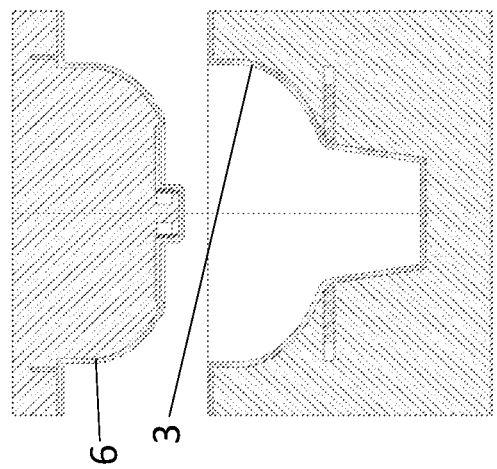

As illustrated in FIG. 10, the plastic sheets 3, 6 are drawn into or onto the respective tool halves 2, 5, forming the outer and inner component geometry respectively, via vacuum.

Figure 11:
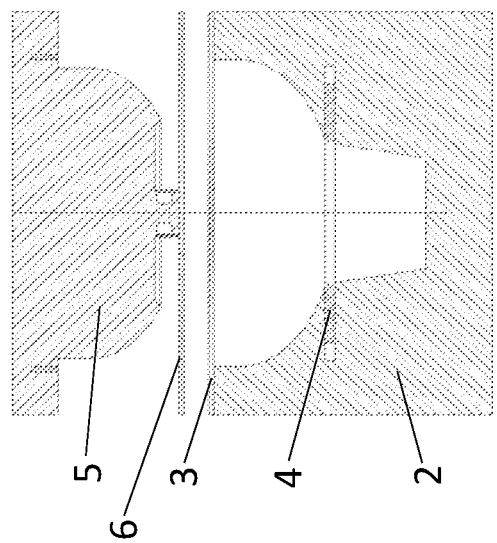

As illustrated in FIG. 11, in the next process block, the insert member 1 to be surrounded is laid in the first tool half 2.

Figure 12:
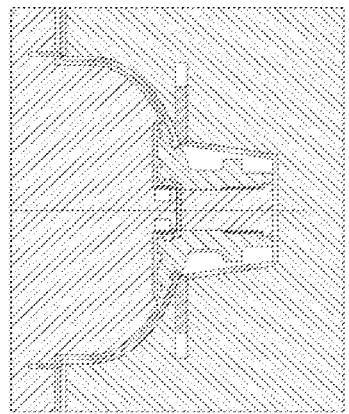

As illustrated in FIG. 12, via a vacuum and/or sliders 4, the space behind the undercut of the insert member 1 necessary for the form-fit connection is filled with plastic.

Figure 3:
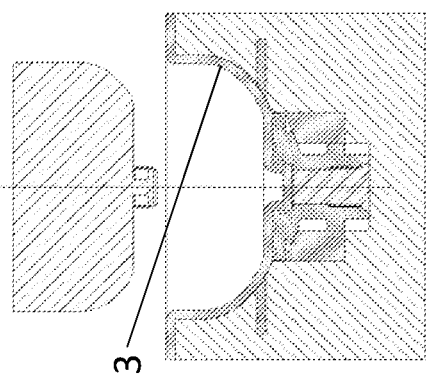
Figure 4:
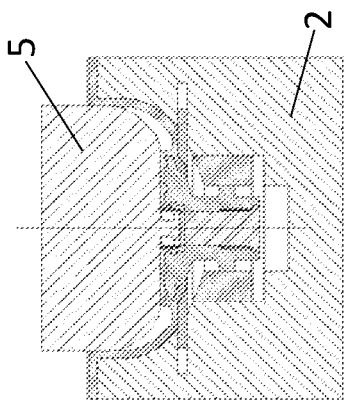
Figure 13:
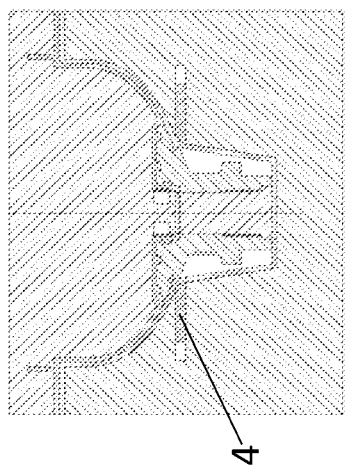

As illustrated in FIG. 13, the surplus material is cut off behind the undercut by the cutting edges introduced into the tool. These cutters, as illustrated in FIG. 3, may also be contained in the sliders 4.

Figure 14:
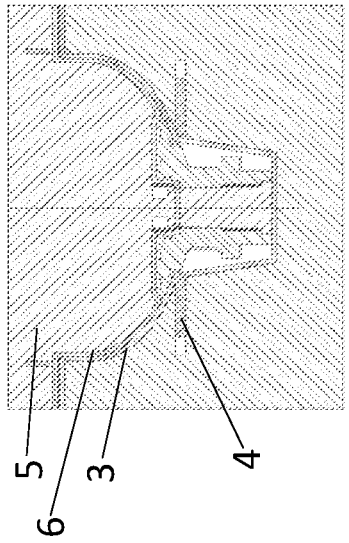

As illustrated in FIG. 14, a finished formed component is provided in which the surplus plastic below the undercut and the slider 4 has been cut away. A sleeve 20 may also be later introduced, and particularly, pressed, into the boss member and/or the plastic inside the boss member.

Figure 15:
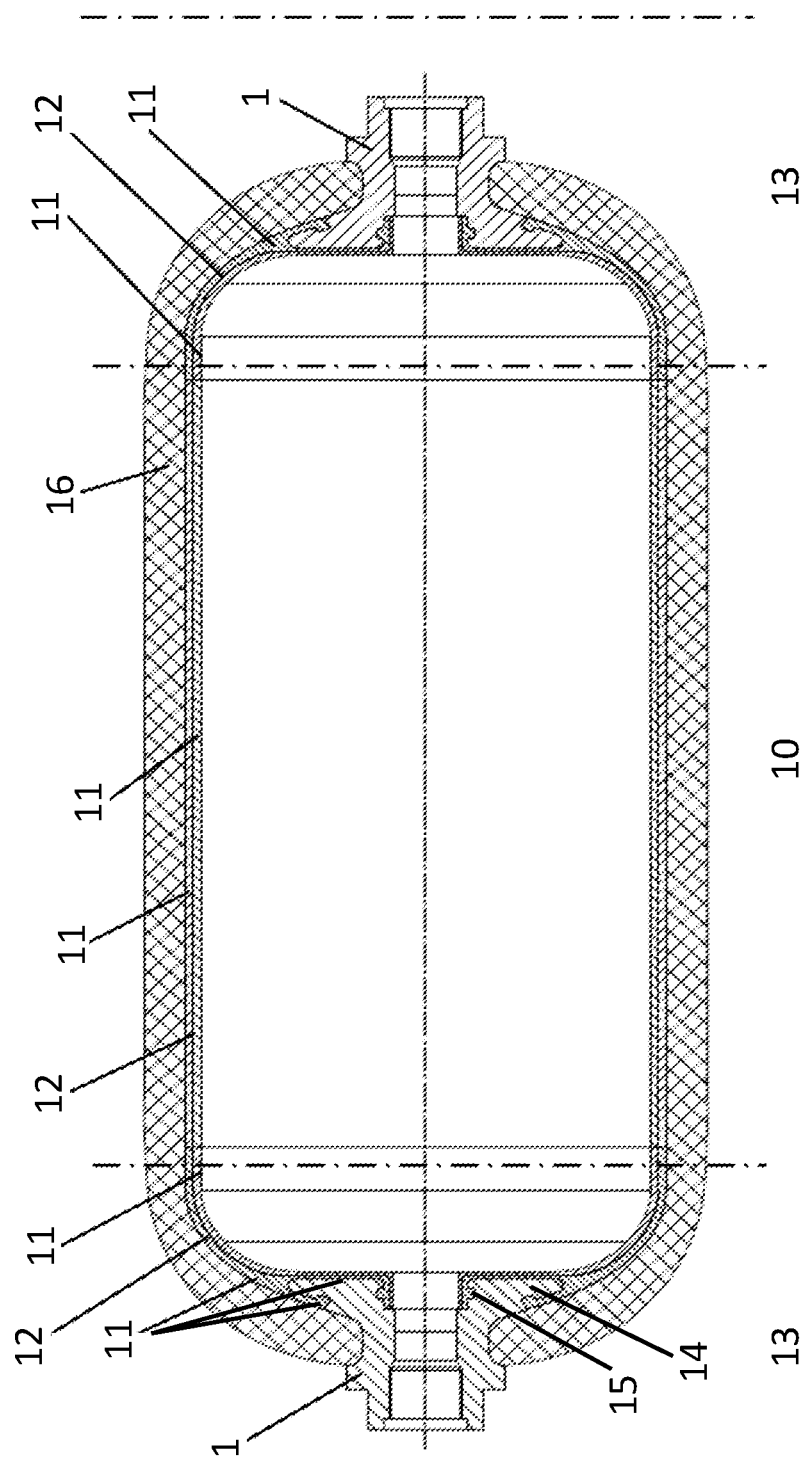
FIG. 15 illustrates a sectional view of a high-pressure container, in accordance with one or more embodiments.

A high-pressure container in accordance with one or more embodiments is illustrated in FIG. 15. The high-pressure container comprises a cylinder 10 as a centre member. The cylinder 10 comprises of a multilayer composite plastic 11 which comprises a barrier layer 12. The high-pressure container furthermore comprises at least one half-shell 13 at an axial end of the cylinder 10, the half-shell 13 comprising a multilayer composite plastic 11 comprising a barrier layer 12. The half-shell 13 furthermore comprises a substantially rotationally symmetrical insert member 1, namely a boss member. The insert member 1 comprises an undercut with respect to a protrusion in the direction of the longitudinal centre axis of the insert member 1, the multilayer composite plastic 11 of the half-shell 13 being arranged axially on both sides of the undercut of the insert member 1.

The undercut is formed by a foot member 14 on the end of the insert member 1 facing the container interior, and has a greater diameter than a centre member of the insert member 1. The multilayer composite plastic 11 is axially arranged on both sides of the foot member 14.

The foot member 14 has several grooves 15 which are filled with the multilayer composite plastic 11 of the half-shell 13. The insert member 1 has substantially the shape of a hollow cylinder. The foot member 14 has substantially the shape of a hollow cone. A groove 15, filled with the multilayer composite plastic 11 of the half-shell 13, extends around the inner circumference of the foot member 14. The multilayer composite plastic 11 of the cylinder 10 transforms into the multilayer composite plastic 11 of the half-shell 13.

The multilayer composite plastic 11 of the half-shell 13 and also of the cylinder 10 comprises a layer of HDPE as the outermost layer and a barrier layer 12 of EVOH. The HDPE may be present as HDPE-S (Schwarz), followed by a regranulate layer, an adhesion-promoting agent, the EVOH layer, optionally a further adhesion-promoting agent and optionally also a further HDPE layer as the innermost layer.

The high-pressure container comprises two half-shells 13 at the axial ends of the cylinder 10, wherein the two half-shells 13 are configured as described above, i.e., they have a boss member 1 which is embedded in the multilayer composite plastic 11. The cylinder 10 and the two half-shells 13 are wrapped with a fibre material 16, such as a composite material comprising carbon fibres and/or glass fibres and/or epoxy resin.

Overall, thus a high-pressure container is produced which may serve for storage of gases under high pressure. It is produced as a lightweight structure and has a multipiece, multilayer plastic liner consisting of two dome caps 13 and a cylinder 10, which ensures the gas-tightness and contains a permeation barrier 12.

Insert parts 1, namely boss parts, more precisely a "headstock" and a "tailstock", are integrated in the two dome caps 13. The permeation properties are provided by a blocking or barrier layer 12 which is contained in the layer structure of the liner, both in the dome caps 13 and also in the cylinder tube 10. The high-pressure container obtains its mechanical strength from a fibre-reinforced composite 16 which is applied to the plastic liner in the winding process and then hardened.

Figure 16:
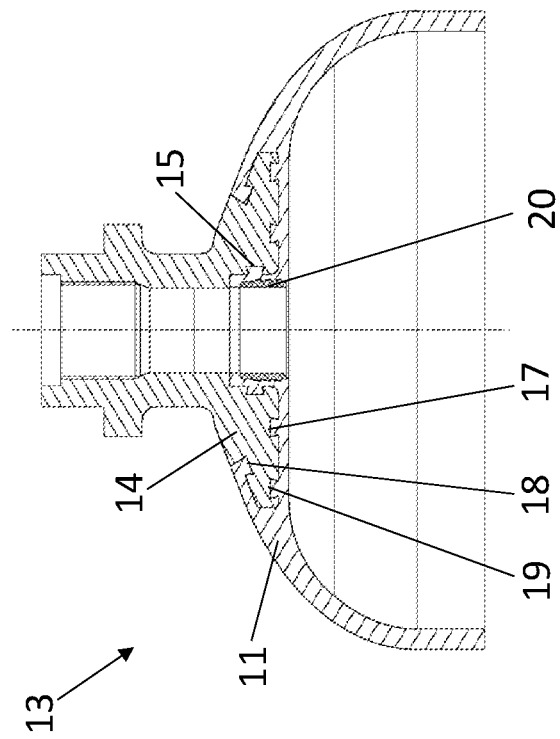
FIG. 16 illustrates a sectional view of a half-shell of a high-pressure container in accordance with one or more embodiments.

FIG. 16 illustrates a half-shell 13 of a high-pressure container in accordance with one or more embodiments before insertion of the sleeve 20. The half-shell 13 comprises a multilayer composite plastic 11 which comprises a barrier layer 12. The half-shell 13 furthermore comprises a substantially rotationally symmetrical insert member 1, namely a boss member. The insert member 1 has a foot member 14 at the end of the insert member 1 facing the container interior and having a greater diameter than the centre member of the insert member 1. The foot member 14 substantially forms a hollow cone.

A first groove 15 filled with the multilayer composite plastic 11 of the half-shell 13 extends around the inner circumference of the foot member 14. The multilayer composite plastic 11 of the half-shell 13 is arranged axially on both sides of the foot member 14.

The foot member 14 has a second groove 17 which is filled with the multilayer composite plastic 11 of the half-shell 13. Proximate to the inner circumference of the foot member 14, the second groove 17 extends around on the base of the foot member 14 facing the container interior.

The foot member 14 has a third groove 18 which is filled with the multilayer composite plastic 11 of the half-shell 13, the third groove 18 extending around on the cover face of the foot member 14 facing the container exterior.

The foot member 14 has a fourth groove 19 which is filled with the multilayer composite plastic 11 of the half-shell 13. Proximate to the outer circumference of the foot member 14, the fourth groove 19 extends around on the base of the foot member 14 facing the container interior.

Figure 17:
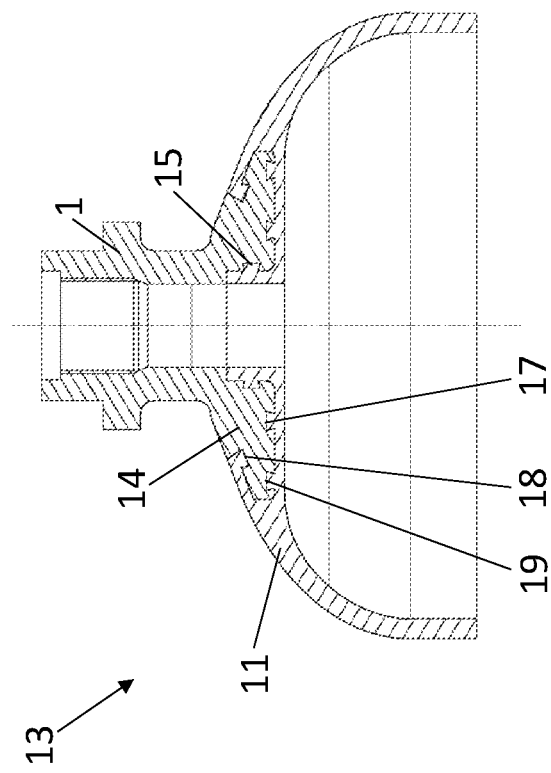
FIG. 17 illustrates a sectional view of a half-shell of a high-pressure container with an inserted sleeve in accordance with one or more embodiments.

As illustrated in FIG. 17, after production of the half-shell, a sleeve 20 is arranged radially inside the first groove 15, inside the inner circumference of the foot member 14. The multilayer composite plastic 11 of the half-shell 13 is pressed by the sleeve 20 against the inner circumference of the foot member 14 and into the first groove 15.

FIG. 18 illustrates a half-shell in accordance with one or more embodiments with a tightly seated valve 21 introduced therein. A sleeve 20 is pressed into the inner circumference of the foot member 14, wherein the plastic 11 of the half-shell 13 is arranged between the sleeve 20 and the inner circumference of the foot member 14. The high-pressure container comprises a valve 21 which is received in the boss member. A shaft portion of the valve 21 is received in the sleeve 20. A sealing element 22, namely a ring seal, seals between the shaft portion of the valve 21 and the sleeve 20.

FIG. 19 illustrates detail A of FIG. 18 more precisely. The sleeve 20 is pressed axially into the inner circumference of the foot member 14, axially in a pressing portion 23 of the sleeve 20, wherein in the region of the pressing, i.e., in the pressing portion 23, a thin plastic layer of the plastic 11 remains, i.e., is pressed, between the sleeve 20 and the inner circumference of the foot member 14. The plastic 11 of the half-shell 13 fills the entire space between the sleeve 20 and the inner circumference of the foot member 14. Because of the effect of the sealing element 22 between the valve 21 and the sleeve 20, only the tightness in the region of the plastic 11 outside the sleeve 20 must be ensured. The thin plastic layer between the sleeve 20 and the inner circumference of the insert member 1, after the sleeve 20 has been pressed in, creates a high tightness in the region of the thin plastic layer and hence in the region of the leakage path, which is illustrated in FIG. 20 by an arrow. Because of the small thickness of the plastic film, the thermal expansion in operation and the shrinkage during the production process in this region are negligibly small and a good seal is guaranteed.

As illustrated in FIG. 20, the container may also be used without sealing element or ring seal in the region of the sleeve 20. A sealing element, in particular a ring seal, may in particular be arranged at the top i.e., on the outlet side of the sleeve 20, between a valve and the insert member 1.

Figure 22:
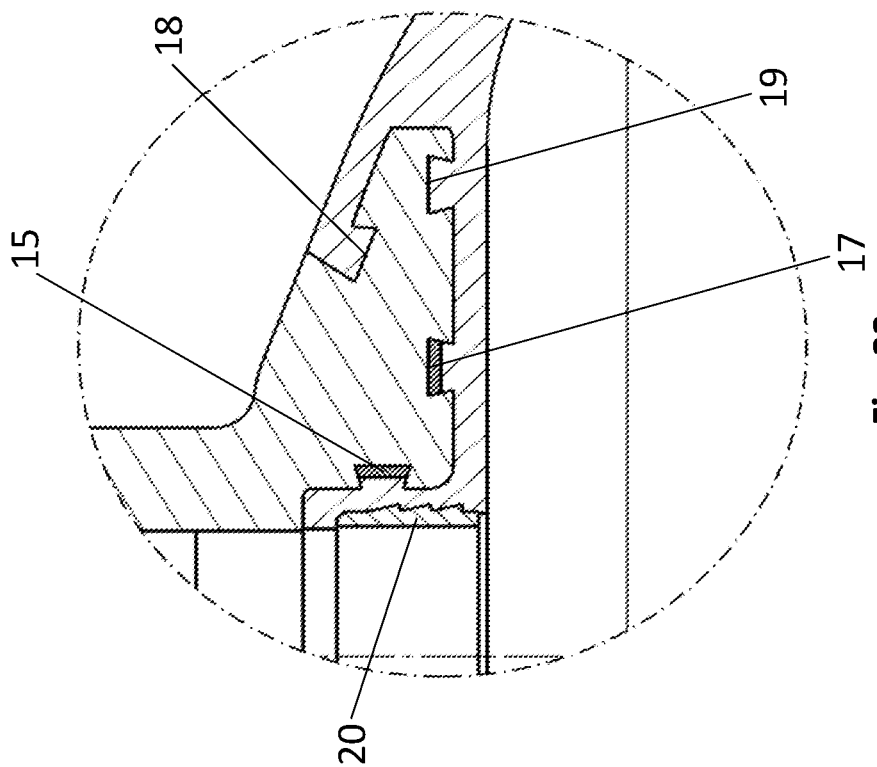
FIG. 22 illustrates a sectional view of detail B of the half-shell of FIG. 21.
Figure 21:
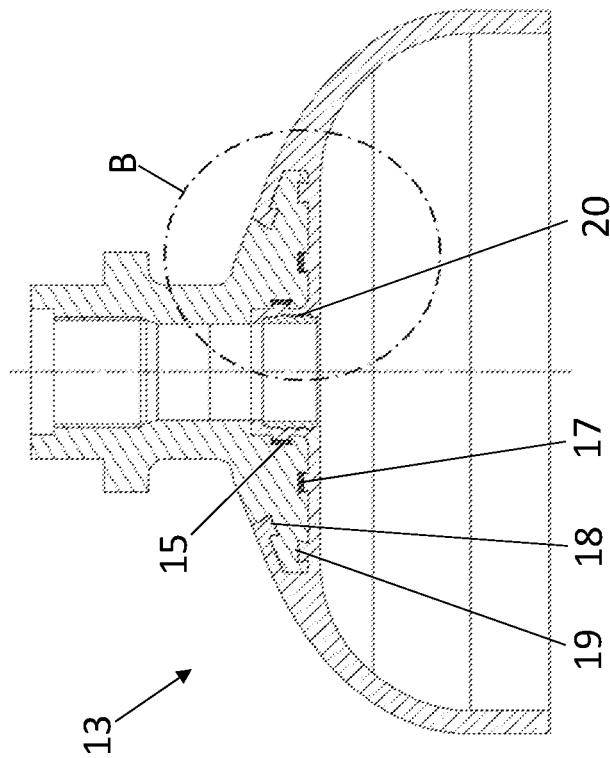
FIG. 21 illustrates a sectional view of a half-shell of a high-pressure container, in accordance with one or more embodiments.

As illustrated in FIG. 21, and in the detail extract of detail B in FIG. 22, a sealing element may be arranged on the base of the grooves, in particular, the first groove 15 and the second groove 17. The primary sealing effect is achieved by the pressing of the plastic into the circularly running grooves 15, 17 on the metal lower member or in the core hole bore of the foot member of the boss member 1. Two further grooves 18, 19 on the plate exterior or plate surface serve above all for form-fit connection and stabilisation of the plastic-metal connection. Because of the sleeve 20 inserted in the core hole bore during the production process, the pressure on the sealing plastic material in the first groove 15 is increased. In an option, one or both sealing grooves 15, 17, as illustrated in FIG. 19, are provided with an additional sealing element in order to increase the sealing effect in this region.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 Insert member, boss member
2 First tool half
3 First plastic plate
4 Slider
5 Second tool half
6 Second plastic plate
7 Receiver
10 Cylinder
11 Multilayer composite plastic
12 Barrier layer
13 Half-shell
14 Foot member
15 First groove
16 Fibre material
17 Second groove
18 Third groove
19 Fourth groove
20 Sleeve
21 Valve
22 Sealing element
23 Pressing portion

What is claimed is:

1. A high-pressure container, comprising:
a cylinder, composed of plastic, to serve as a centre member, the cylinder including:
   at least one half-shell, composed of a multilayer composite plastic that includes a plastic layer and a barrier layer, at an axial end of the cylinder;
   a boss member having a foot member at an end thereof facing an interior of the high-pressure container, the foot member being embedded in the plastic of the half-shell to substantially form a hollow cone or hollow cylinder, the foot member having a first groove filled with the multilayer composite plastic of the half-shell, and which extends around an inner circumference of the foot member at a level of the sleeve, a second groove which is filled with the multilayer composite plastic of the half-shell, and which extends around at least in portions on the base of the foot member facing the interior of the high-pressure container;
   a sleeve pressed into the inner circumference of the foot member;
   a valve received in the boss member, the valve having a shaft portion received in the sleeve;
   a first sealing element, arranged on a base of the first groove between the plastic layer and the foot member, to form a first seal; and
   a second sealing element, arranged on a base of the second groove between the plastic layer and the foot member, to form a second seal.

2. A high-pressure container, comprising:
a cylinder, composed of plastic, to serve as a centre member, the cylinder including:
   at least one half-shell, composed of a multilayer composite plastic that includes a plastic layer and a barrier layer, at an axial end of the cylinder;
   a boss member having a foot member at an end thereof facing an interior of the high-pressure container, the foot member being embedded in the plastic of the half-shell to substantially form a hollow cone or hollow cylinder, the foot member having a first groove filled with the multilayer composite plastic of the half-shell, and which extends around an inner circumference of the foot member at a level of the sleeve, a second groove which is filled with the multilayer composite plastic of the half-shell, and which extends around at least in portions on the base of the foot member facing the interior of the high-pressure container, a third groove which is filled with the multilayer composite plastic of the half-shell and which extends around at least in portions on a cover face of the foot member that faces the interior of the high-pressure container, and a fourth groove which is filled with the multilayer composite plastic of the half-shell, and which extends around at least in portions on the base of the foot member facing the interior of the high-pressure container;
   a sleeve pressed into the inner circumference of the foot member;
   a valve received in the boss member, the valve having a shaft portion received in the sleeve;
   a first sealing element, arranged on a base of the first groove between the plastic layer and the foot member, to form a first seal; and
   a second sealing element, arranged on a base of the second groove between the plastic layer and the foot member, to form a second seal.

3. The high-pressure container of claim 2, wherein the first groove, the second groove, the third groove, and the fourth groove have a trapezoid form which widens towards the base of the groove.

* * * * *